US012591947B2

(12) United States Patent　(10) Patent No.: US 12,591,947 B2
Sadi et al.　(45) Date of Patent: Mar. 31, 2026

(54) DISTORTION-BASED IMAGE RENDERING

(71) Applicant: SAMSUNG ELECTRONICS CO., LTD., Gyeonggi-do (KR)

(72) Inventors: Sajid Sadi, San Jose, CA (US); Varun Menon, Mountain View, CA (US); Siddarth Ravichandran, Santa Clara, CA (US); Chuhua Wang, Sunnyvale, CA (US); Hyun Jae Kang, Mountain View, CA (US); Rahul Lokesh, Sunnyvale, CA (US); Vignesh Gokul, Mountain View, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 175 days.

(21) Appl. No.: 18/433,133

(22) Filed: Feb. 5, 2024

(65) Prior Publication Data

US 2024/0394830 A1　Nov. 28, 2024

Related U.S. Application Data

(60) Provisional application No. 63/468,854, filed on May 25, 2023.

(51) Int. Cl.
*G06T 3/18*　(2024.01)
*G06T 11/60*　(2006.01)
*G06V 10/25*　(2022.01)

(52) U.S. Cl.
CPC ................ *G06T 3/18* (2024.01); *G06T 11/60* (2013.01); *G06V 10/25* (2022.01)

(58) Field of Classification Search
CPC ...................................................... G06T 3/18
See application file for complete search history.

(56) References Cited

U.S. PATENT DOCUMENTS 11,158,102 B2　10/2021　Liu et al.
2021/0327404 A1 *　10/2021　Savchenkov ........ G06V 10/764
(Continued)

FOREIGN PATENT DOCUMENTS

CM　113554737 A　10/2021
CN　107644228 A　1/2018
(Continued)

OTHER PUBLICATIONS

WIPO Int'l. Appln. PCT/KR2024/004003, International Search Report, Jul. 16, 2024, 3 pg.
(Continued)

*Primary Examiner* — Shivang I Patel
(74) *Attorney, Agent, or Firm* — Kevin T. Cuenot

(57) ABSTRACT

Synthesizing high-resolution input for rendering a digital human includes generating, with a generative artificial intelligence (AI) model, a distorted image of the digital human by enhancing a region of interest (ROI) within the distorted image relative to other regions of the distorted image. The generative AI model is previously trained against a distorted control image generated using a distortion function to distort a control image used to guide image generation by the generative AI model. The distorted control image is generated by reconfiguring and augmenting pixels of the control image. An undistorted image of the digital human is generated using a reverse distortion function to reverse distortion of the distorted image.

20 Claims, 15 Drawing Sheets

(56) References Cited

U.S. PATENT DOCUMENTS

| | | | |
|---|---|---|---|
| 2023/0014604 A1 | 1/2023 | Kim et al. | |
| 2023/0042654 A1* | 2/2023 | Zhang | H04N 21/2368 |
| 2024/0055015 A1* | 2/2024 | Chae | G06N 3/0475 |

FOREIGN PATENT DOCUMENTS

| | | | |
|---|---|---|---|
| CN | 111652796 A | 9/2020 | |
| CN | 113609255 A | 11/2021 | |
| WO | 2020091891 A1 | 5/2020 | |
| WO | 2022195305 A1 | 9/2022 | |
| WO | 2022255529 A1 | 12/2022 | |

OTHER PUBLICATIONS

WIPO Int'l. Appln. PCT/KR2024/004003, Written Opinion, Jul. 16, 2024, 5 pg.

Ma, Y. et al., "Variable rate roi image compression optimized for visual quality," In Proceedings of the IEEE/CVF Conference on Computer Vision and Pattern Recognition 2021, Sep. 1, 2021, pp. 1936-1940.

Siarohin, A. et al., "First order motion model for image animation," Advances in Neural Information Processing Systems, vol. 32, 2019.

Prajwal, KR et al., "A lip sync expert is all you need for speech to lip generation in the wild," In Proceedings of the 28th ACM International Conference on Multimedia, Oct. 12, 2020, pp. 484-492.

"Best AI Video Generator in 2024—Synthesia," [online] Synthesia Limited © 2024 [retrieved Jan. 25, 2024], retrieved from the Internet: <https://www.synthesia.io/>, 9 pg.

EPO Appln. 24811245.0, Extended European Search Report, Dec. 11, 2025, 11 pg.

Chu, W. et al., "Learning to Caricature Via Semantic Shape Transform," Int'l. J. of Computer Vision, vol. 129, No. 9, Jul. 9, 2021, pp. 2663-2679.

Ravichandran, S. et al., "Synthesizing Photorealistic Virtual Humans Through Cross-model Disentanglement," In Proc. of the IEEE/CVF Conference on Computer Vision and Pattern Recognition, Mar. 24. 2023, arXiv:2209.01320v2, Mar. 24, 2023, 12 pg.

* cited by examiner

500

110    502    504

Generate, with a generative artificial intelligence (AI) model a distorted image of a digital human, wherein the generative AI model is previously trained against a distorted control image generated using a distortion function to distort a control image used to guide image generation by the generative AI model, the distorted control image generated by reconfiguring and augmenting pixels of the control image
602

Generate an undistorted image of the digital human using a reverse distortion function to reverse distortion of the distorted image
604

Generate a digital human animation by sequentially rendering the undistorted image in an ordered sequence with other undistorted images of the digital human
606

Figure 7:
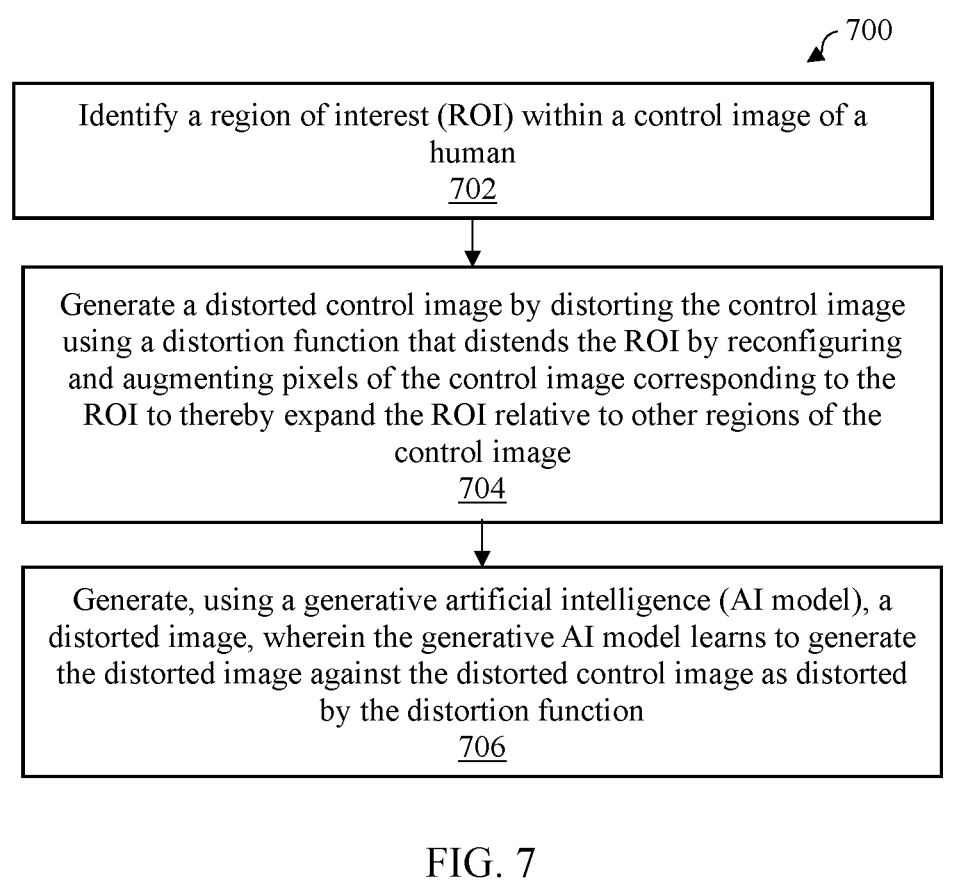

Identify a region of interest (ROI) within a control image of a
human
702

Generate a distorted control image by distorting the control image
using a distortion function that distends the ROI by reconfiguring
and augmenting pixels of the control image corresponding to the
ROI to thereby expand the ROI relative to other regions of the
control image
704

Generate, using a generative artificial intelligence (AI model), a
distorted image, wherein the generative AI model learns to generate
the distorted image against the distorted control image as distorted
by the distortion function
706

DISTORTION-BASED IMAGE RENDERING

CROSS-REFERENCE TO RELATED APPLICATIONS

This application claims the benefit of U.S. Application No. 63/468,854 filed on May 25, 2023, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to generative artificial intelligence (AI) and, more particularly, to generative AI models for generating images.

BACKGROUND

Machine-human interactions increasingly involve interactive exchanges between a human (the user) and a digital human or other type of computer-generated avatar. Such computer-generated entities have the appearance and behavior of real humans, thus making machine-human interaction more like conversations between actual humans. One impetus for the proliferation of digital humans is the emergence of generative AI models. Whereas classical computer graphics typically requires a considerable amount of tedious and expensive manual work to model the geometry, surface properties, camera angles, and other attributes of a digital human, generative AI models learn to generate images from a latent space (a vector space) that captures statistical information about a dataset of images. By sampling and decoding latent points from the latent space, a generative AI model, such as a generative adversarial network (GAN) or variational auto encoder (VAE), can generate original images or videos by mapping the points to an image space.

SUMMARY

In one or more embodiments, a computer-based method of rendering a digital human using generative AI is disclosed. The method includes generating, with a generative AI model, a distorted image of a digital human. The distorted image generated by enhancing a region of interest (ROI) within the distorted image relative to other regions of the distorted image. The generative AI model is previously trained against a distorted control image generated using a distortion function to distort a control image used to guide image generation by the generative AI model. The distorted control image is generated by reconfiguring and augmenting pixels of the control image. The method includes generating an undistorted image of the digital human using a reverse distortion function to reverse distortion of the distorted image.

In one or more embodiments, a computer-based method of training a generative AI model for generating a digital human is disclosed. The method includes identifying an ROI within a control image of a human. The method includes generating a distorted control image by distorting the control image using a distortion function. The distortion function distends the ROI by reconfiguring and augmenting pixels of the control image corresponding to the ROI to thereby expand the ROI relative to other regions of the source image. The method includes generating a distorted image, using the generative AI model, with the generative AI model learning to generate the distorted image against the distorted control image as distorted by the distortion function.

In one or more embodiments a system includes one or more processors configured to execute operations. The operations include generating, with a generative AI model, a distorted image of a digital human. The distorted image generated by enhancing a region of interest (ROI) within the distorted image relative to other regions of the distorted image. The generative AI model is previously trained against a distorted control image generated using a distortion function to distort a control image used to guide image generation by the generative AI model. The distorted control image is generated by reconfiguring and augmenting pixels of the control image. The operations include generating an undistorted image of the digital human using a reverse distortion function to reverse distortion of the distorted image.

In one or more embodiments, a computer program product includes a computer readable storage medium having program instructions stored thereon. The program instructions are executable by a processor to perform the various operations described within this disclosure.

This Summary section is provided merely to introduce certain concepts and not to identify any key or essential features of the claimed subject matter. Many other features and embodiments of the disclosed technology will be apparent from the accompanying drawings and from the following detailed description.

BRIEF DESCRIPTION OF THE DRAWINGS

The accompanying drawings show one or more embodiments; however, the accompanying drawings should not be taken to limit the disclosed technology to only the embodiments shown. Various aspects and advantages will become apparent upon review of the following detailed description and upon reference to the drawings.

FIG. 6 is an example method illustrating certain operative features of the DBIR framework of FIG. 1.

FIG. 7 is another example method illustrating certain operative features of the DBIR framework of FIG. 1.

DETAILED DESCRIPTION

Figure 1A:
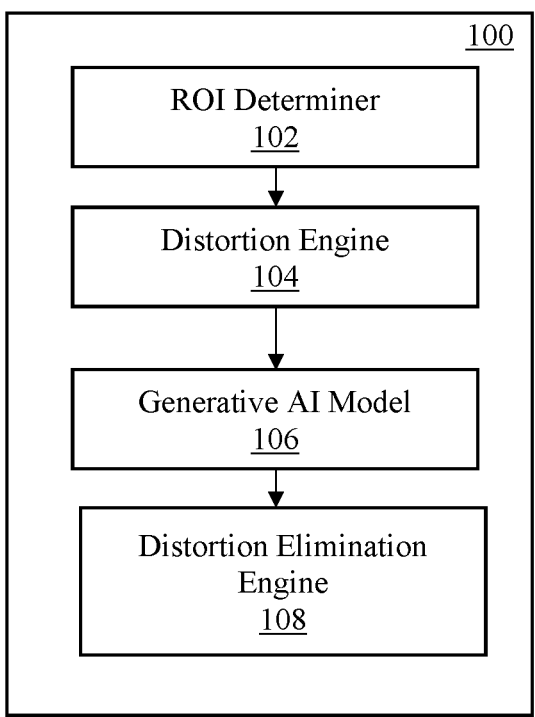
FIGS. 1A-1C illustrate an example architecture and certain operative aspects of a distortion-based image rendering (DBIR) framework.

While the disclosure concludes with claims defining novel features, it is believed that the various features described herein will be better understood from consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to generative AI and, more particularly, to generative AI models for generating images. Generative AI models to a considerable extent supplant much of the work formerly done manually in generating images and videos. Automatically synthesizing video with a generative AI model (also referred to herein as image rendering) typically combines features extracted from a source image to create a sequence of new images rendered as a video. For example, a variational autoencoder (VAE) may sample latent points from a latent space of the source image features and, either deliberately or randomly, map them to an image space, generating previously unseen images, which can be sequentially rendered as a video. A generative adversarial network (GAN), using a generator network generates synthetic images by decoding a random point in latent space. Using a discriminator network (or adversary), the GAN predicts whether an image input (real or synthetic) came from a training set or was created by the generator network. Thus, the generator is trained to fool the discriminator network, generating increasingly realistic images (rendered as video) as training goes on.

Notwithstanding rapid advances in generative AI, certain limitations remain A limitation of machine learning generally in the context of image rendering concerns objects within an image that are relatively small with respect to others in the image. For example, in rendering images of a digital human, the mouth region of a source image of a human is typically much smaller than other facial features. The predominance of other facial features over those of the mouth impedes the generative AI model's learning crucial aspects of the mouth from the source image. There are too few mouth features (e.g., pixels) and those that are available are dominated by other features (e.g., hair, skin, clothing, background) that cover a greater portion of the image. Accordingly, too much of the machine learning relates to other facial, body, clothing, and/or background features (depending on the nature of the source image) and too little relates to the mouth.

The under-learning of the mouth may give rise to anomalous artifacts and renders features of the mouth less clearly. Whenever the model is required to generate a high-resolution image that includes many features (e.g., skin texture, hair, eyes), less learning is devoted to smaller objects (e.g., teeth, lips). This is especially problematic given that in many applications the digital human may appear as a life-sized image rendered on a large screen (e.g., a hotel or airport kiosk). In such instances, it is important that the mouth of the digital human be rendered with a very high-resolution, especially if mouth movements are synchronized with audio rendered by the digital human engaged in conversation.

In accordance with the inventive arrangements disclosed herein, methods, systems, and computer program products are provided that are capable of generating high-resolution images that may be used to generate a life-like animated rendering of a digital human. The inventive arrangements distort the control image that serves to guide the rendering and leverage the distortion to generate a high-resolution image, enabling generation of a highly realistic digital human. Digital human animation may be generated sequentially rendering multiple high-resolutions images in an ordered sequence to create a video animation of the digital human. As used herein, the term "digital human" refers not only to digital humans but also to generative AI renderings of virtual humans, avatars having life-like features, and the like.

Thus, as used herein, the term digital human includes photorealistic avatars, digital renderings of hominids, and other human-like characters. Moreover, as described herein, a digital human may include various elements of AI for interpreting user input and responding to the input in a contextually appropriate manner. Using verbal and/or non-verbal cues, the digital human may interact with a user. In various arrangements, implementing natural language processing (NLP) a chatbot, and/or other software, the digital human may be configured to provide human-like interactions with the user and/or perform tasks such as scheduling, initiating, terminating, and/or monitoring operations of various systems and devices.

In certain aspects, one or more regions of interest (ROIs) of a source or control image of a human are distorted to enhance each ROI relative to other portions of the image. The now-distorted image is input to a generative AI model (e.g., GAN), which generates a distorted AI-rendered image against the distorted image. As used herein, "generated against" means that the generative AI model generates a distorted AI rendering by iteratively adjusting the model parameters until the model is able to generate the AI rendering with sufficient similarity to the distorted image of the human.

A general technical effect of the distortion is to enhance the data (e.g., pixels) representing the ROI so that the ROI of an AI-generated digital human has higher resolution than it would otherwise if an image were generated with conventional technologies. If the ROI of the source or control image is sparse—as it typically is, for example, with the mouth of a human image—then the model almost invariably will fail to generate an image in which the ROI has sufficient resolution. The reason is that the model in generating the digital human pays relatively less attention to sparse data relative to other data. In generating a digital human, the mouth is likely represented by sparse data, which means the model likely fails to render the lips, teeth, and mouth with sufficient resolution. As a result, the digital human will not appear to speak like a real human. The distortion engendered by the inventive arrangements overcomes this limitation by enhancing the data representing the ROI such that the model pays greater attention to the ROI than it otherwise would with conventional image rendering techniques.

For example, with a sequence of images of a human speaking, the mouth is a region of the image that likely moves with greatest frequency and in a varied manner. Thus, to incorporate the motion and have the generative AI model assign higher importance to the ROI, the inventive arrangements distort the source or control image of the human such that regions with low variance (less motion) are distorted by reducing the number of pixels of the regions, while enhancing the number of pixels of the ROI having greater variance. Distortion induced by the inventive arrangements creates an image in which the ROI covers a larger number of pixels compared to the original source or control image. The model is thus better able to leverage the data in generating an image in which the ROI is rendered with greater resolution.

In addition to generating images with greater overall resolution for even the region(s) represented by sparse data, the inventive arrangements are able to do so without any additional burden on computing resources. Specifically, rather than allocating extra memory for storing greater amounts of data pertaining to the ROI(s), the inventive arrangements reconfigure the image by leveraging distortion so that a fixed amount of memory is reallocated to the enhanced data of the ROI(s). The allocated memory is taken from the non-sparse data without increasing the overall amount of memory needed for rendering images having higher resolution in the ROI(s). Accordingly, this is another technical effect of the inventive arrangements.

In certain embodiments, the inventive arrangements identify one or more ROIs within a source or control image of a human. The inventive arrangements generate a distorted control image by distorting the control image using a distortion function. The distortion function distends the ROI by reconfiguring and augmenting pixels of the control image corresponding to the ROI, thereby expanding the ROI relative to other regions of the source image. The inventive arrangements implement a generative AI model (e.g., GAN) that generates a distorted image of a digital human distinct from the control image. That is, the distorted image of the digital human is generated against the control image, as distorted by the distortion function. An undistorted image of a digital human is generated by the inventive arrangements using a reverse distortion function applied to the distorted AI image. The undistorted image of the digital human may be combined with other, similarly generated undistorted images of the digital human to generate an animated rendering of the digital human.

The generative AI model learns to generate the distorted image of the digital human from distortion data input to the generative AI model. The distortion data, for example, may comprise a distorted contour image, whose creation is guided by landmarks of the control image of a human. The landmarks may be distorted by applying the distortion function. The distorted landmarks are then used to create the distorted contour image.

In other embodiments, the generative AI model learns to generate the distorted image of the digital human from distortion data input comprising multimodal data. For example, the multimodal data may include a contour image and one or more portions of an audio segment. The audio segment may be used to drive generation of the ROI (e.g., the mouth) in generating the distorted image of the digital human.

The distortion function is a continuous function. In certain embodiments, the continuous function is a monotonically non-decreasing function that distorts the ROI. In certain embodiments, the distortion function is a spline, for example. In other embodiments, for example, the distortion function is one that effects a radial expansion from an approximate center of the ROI. The undistorted image of the digital human is generated by a reverse distortion function applied to the distorted image of the digital human. If the specific distortion function is non-reversible, then the reverse distortion function is obtained by fitting a polynomial to sampled points of the distorted AI image.

In cases in which the source image includes additional ROIs, the inventive arrangements sequentially distort the control image using the distortion function to distend each of the ROIs by reconfiguring and augmenting pixels corresponding to each of the ROIs. The undistorted image of the digital human is generated by the inventive arrangements applying a reverse distortion function to each of the ROIs in a reverse sequence of the distorting by the distortion function.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 1B:
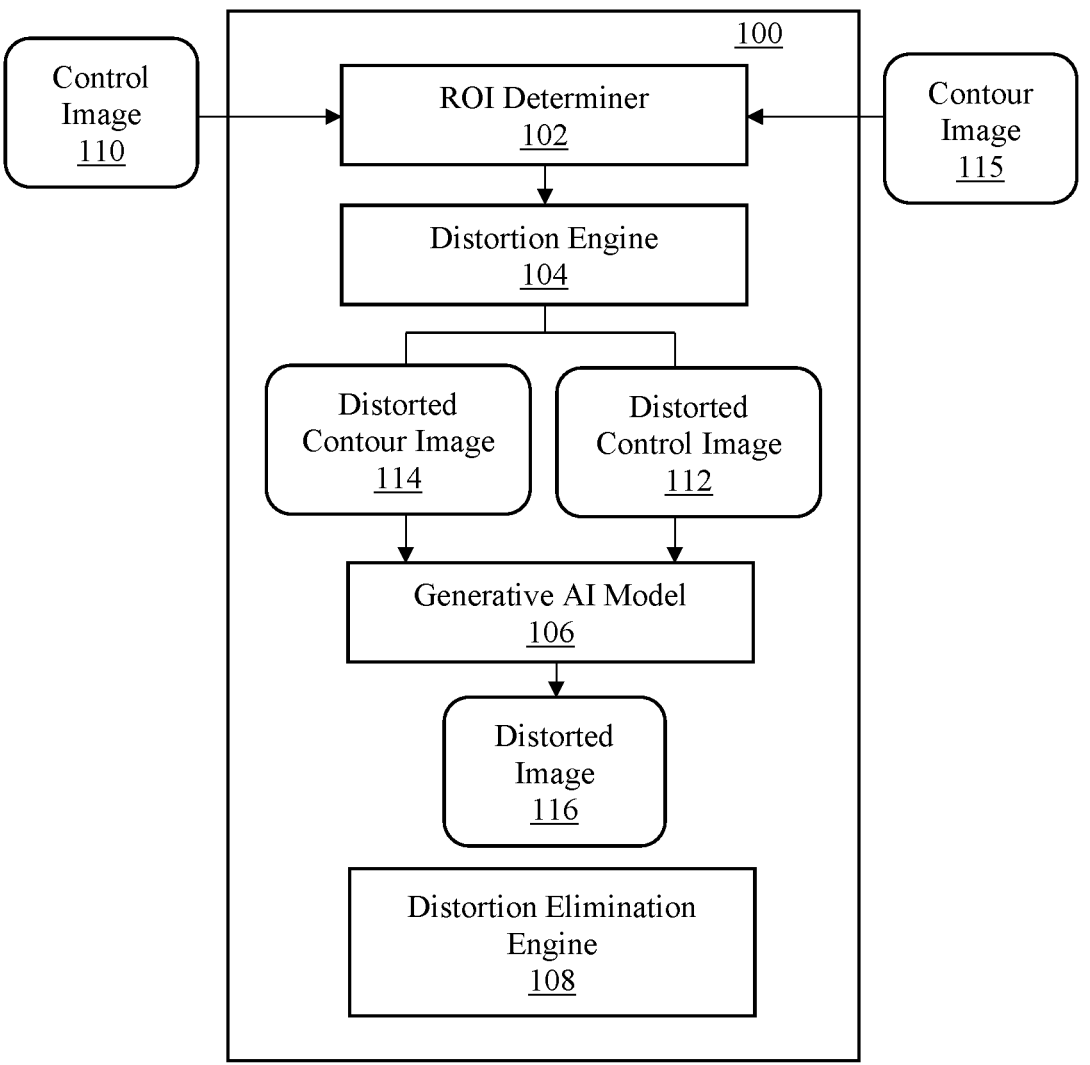
Figure 1C:
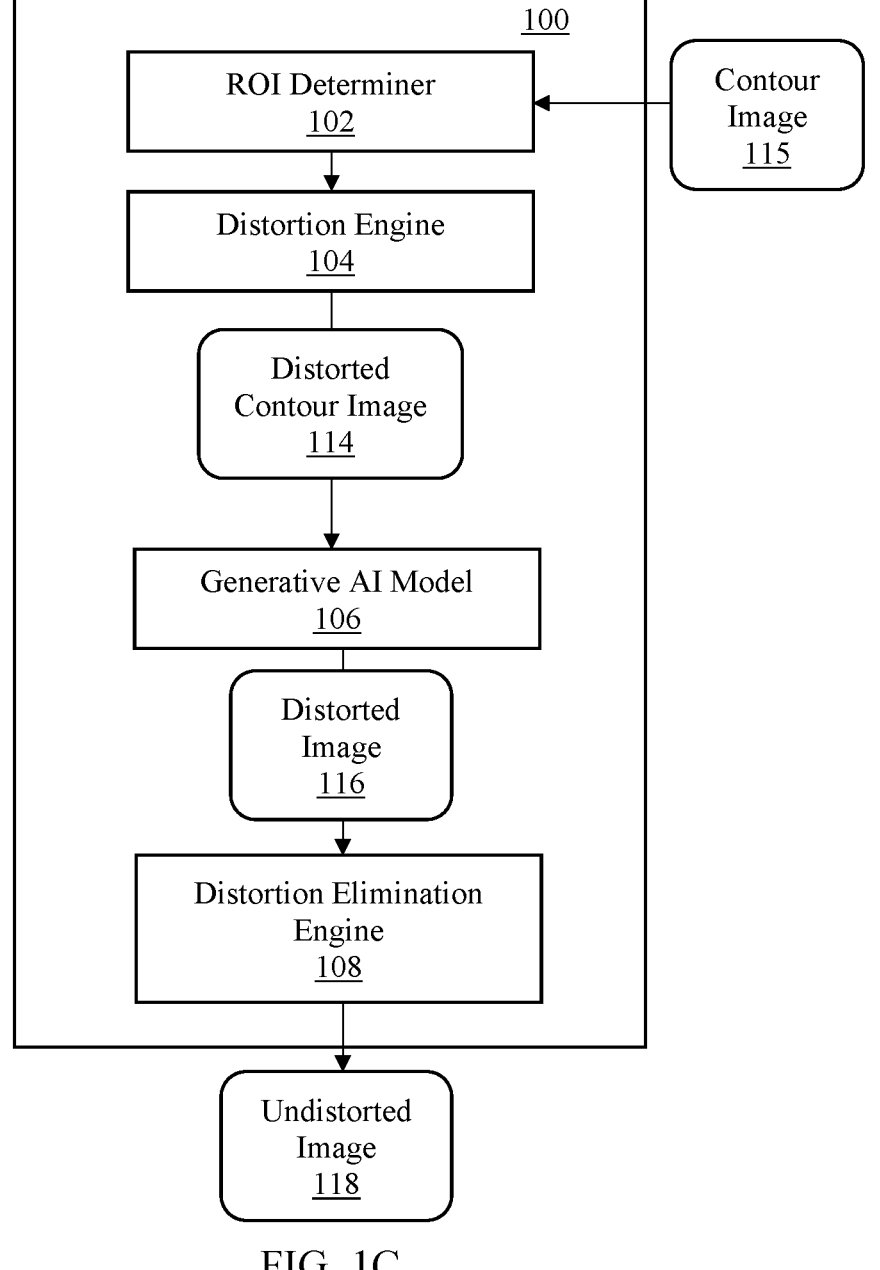

FIGS. 1A-1C, collectively referred to as FIG. 1, illustrate an example architecture and certain operative aspects of a distortion-based image rendering (DBIR) framework 100, according to certain embodiments. FIG. 1A illustrates the example architecture for DBIR framework 100. DBIR framework 100 illustratively includes ROI determiner 102, distortion engine 104, generative AI model 106, and distortion elimination engine 108. The various components of DBIR framework 100, in one or more embodiments, may be implemented as computer-executable code, or software, that is executable by a data processing system such as data processing system 1300 described herein with respect to FIG. 13.

FIG. 1B illustrates certain operative aspects of DBIR framework 100 performed during a training phase. During training, distortion engine 104 distorts control image 110 of a human to generate distorted control image 112. Generative AI model 106, as described herein, is trained against distorted control image 112 using distorted contour image 114. Distorted contour image 114 is generated by distortion engine 104 distorting landmarks of contour image 115, a contour image of control image 110. Generative AI model 106 learns to generate distorted image 116 against distorted control image 112. Distorted image 116 may be conveyed to distortion elimination engine 108 during run-time inference, as described below.

FIG. 1C illustrates certain operative aspects of DBIR framework 100 performed during an inference phase. During a run-time inference, generative AI model 106 generates distorted image 116 in response to the input of a different or same distorted contour image 115. Distortion elimination engine 108 eliminates the distortion of distorted image 116, generating high-resolution undistorted image 118 of a digital human image. DBIR framework 100 may generate multiple high-resolution undistorted images of a digital human, which are then sequentially rendered in an ordered sequence to create an animation of the digital human.

Operatively, during the training phase illustrated in FIG. 1B, ROI determiner 102 identifies features of control image 110 that indicate an ROI. Distortion engine 104 implements a distortion function to generate distorted control image 112, which is generated by enhancing each ROI relative to other portions of control image 110 in accordance with the distortion function. Generative AI model 106 is trained using distorted contour image 114. Distorted contour image 114 may be generated by distorting landmarks of contour image 115, as described in greater detail below.

Distorted image 116 is generated by generative AI model 106 against distorted control image 112. Distorted image 116 provides high-resolution to each of the ROIs. For the task of generating an undistorted image of the digital human during inference illustrated in FIG. 1C, distortion elimination engine 108 reverses the distortion of distorted image 116, thereby generating undistorted image 118. The process is capable of generating multiple undistorted images of the digital human. Multiple frames of the undistorted images may be sequentially rendered in a specific order to generate an animated rendering of the digital human.

Control image 110 may be that of an actual human or one created, either manually or by a computer, for generating an AI rendering of a digital human by combining facial and/or other bodily features of the human. DBIR framework 100, once generative AI model 106 is trained, can be used for creating digital human animation during run-time inference.

ROI determiner 102 identifies each ROI within control image 110. The ROI may comprise a relatively small portion of the entirety of control image 110 and/or exhibit high variability from one frame to another of the image. Specifically, in the context of an AI rendering of a digital human, the ROI of control image 110 is likely the mouth, though may be other ROIs. For example, other ROIs may include those of the eyes and/or hands of the digital human. Pixel-wise, the region of the mouth includes relatively small objects such as the lips and partially exposed portions of the teeth seen when the lips are parted. Additionally, the pixels of the region of the mouth exhibit high variability whenever the digital human is rendered speaking or engaging with a user in conversation. The small number of pixels means that with conventional AI rendering the generative AI model has available less data for generating the mouth and corresponding movements as compared with rendering other aspects of the image such as hair, skin, clothing, and the like. Moreover, the ROI pixels associated with the mouth exhibit a relatively higher degree of variance because the pixels' values change with high frequency given the movement of the mouth and lips when the digital human is speaking, thus further challenging the generative AI model 106 in rendering the mouth of the digital human. Though perhaps to a lesser extent, the eyes of the digital human are relatively small relative to other portions of the image and may also exhibit high variance owing to the blinking and shifting focus of the eyes. So, too, with respect to hands of the human of control image 110 if the image includes more than simply the face. Thus, in some arrangements, there may be more than one ROI within control image 110.

In certain embodiments, an ROI within control image 110 is annotated prior to input to DBIR framework 100. Different types of annotation may be used by ROI determiner 102 to identify the ROI. As an illustrative, non-limiting example ROI determiner 102 identifies the mouth of the human of control image 110 that is enclosed within a bounding box.

Distortion engine 104 distorts control image 110 by reconfiguring and augmenting the pixels corresponding to the ROI, thereby expanding the ROI relative to other regions of the image. For example, if the ROI occupies five (5) percent of the total image, then distortion engine 104 may distort the image such that the ROI expands to ten (10) or fifteen (15) percent of the image. The augmentation of the number of pixels for the ROI enables generative AI model 106 to assign higher importance to the ROI than would otherwise be the case with conventional image rendering. Pixels that would otherwise have corresponded to a larger, less variable region (e.g., hair, clothing, background) are allocated to the ROI (e.g., mouth). The expanded ROI may be supplanted with newly generated pixels (e.g., generated through interpolation) corresponding to the ROI to complete the enlargement of the ROI relative to other portions of control image 110. In certain embodiments, the total number of pixels of the image after distortion remains the same as that of the image before distortion, with the newly generated pixels filling in the expanded ROI replacing the pixels of regions now overtaken by the expanded ROI.

In certain embodiments, distortion engine 104 distorts control image 110 by implementing a distortion function. The distortion function distends the ROI of control image 110 by adjusting the coordinates of the image pixels of the ROI in accordance with specific calculations. In certain embodiments, the distortion function is a spline. A spline is a mathematical function defined by piecewise polynomials capable of creating a smooth curve connecting irregular data points (e.g., pixel coordinates). The spline, for example, is capable of creating a quadrilateral distortion that maps corners of the ROI to new coordinates and then maps other pixels in proportion to the newly shaped quadrilateral. The distortion is created using over-indexing to stretch the image leftward from the ROI center and under-indexing to stretch the image rightward from the ROI center. Over-indexing also stretches portions over the center of the ROI upward, and under-indexing pulls portions under the center downward. The mappings relocate the ROI pixels to expand the ROI. Interpolation may be performed to fill-in the expanded portions with pixels corresponding to the ROI.

The distortion function, in other embodiments, is a function that radially expands the ROI out from the center of the ROI. For example, the distortion function stretches pixels over the ROI center upwards, pixels to the left and right of the ROI center are stretched leftward and rightward, respectively, and pixels below the ROI center are stretched downward. In other embodiments, different distortion functions may be implemented by distortion engine 104. For example, another distortion function implemented by distortion engine 104 may be a polynomial fitted by distortion engine 104's estimating the ROI. Interpolation, as described below, may be performed to fill-in the expanded portions with pixels corresponding to the ROI.

Figure 2B:
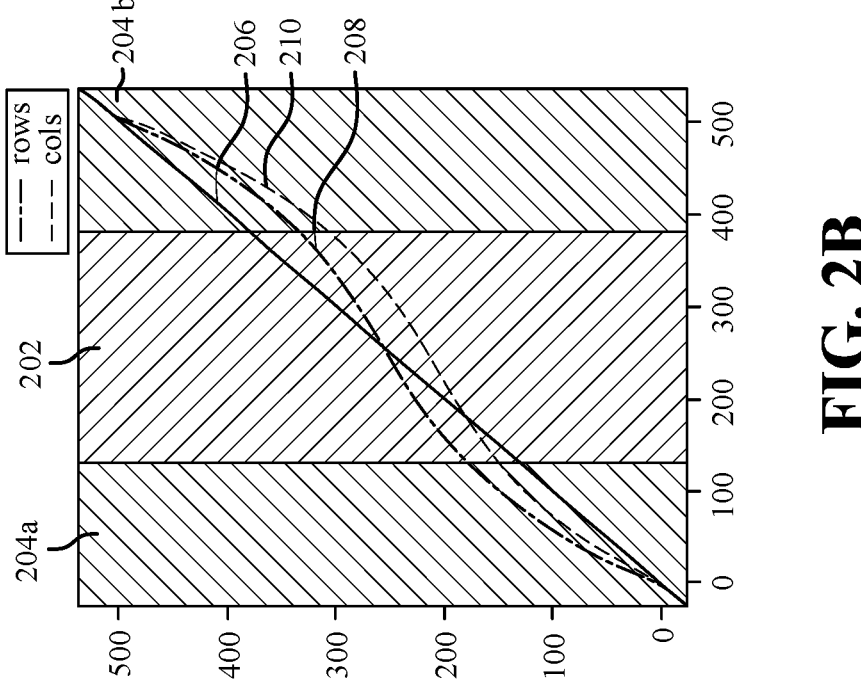
FIGS. 2A and 2B illustrate operative aspects, according to certain embodiments, of the DBIR framework of FIG. 1.
Figure 2A:
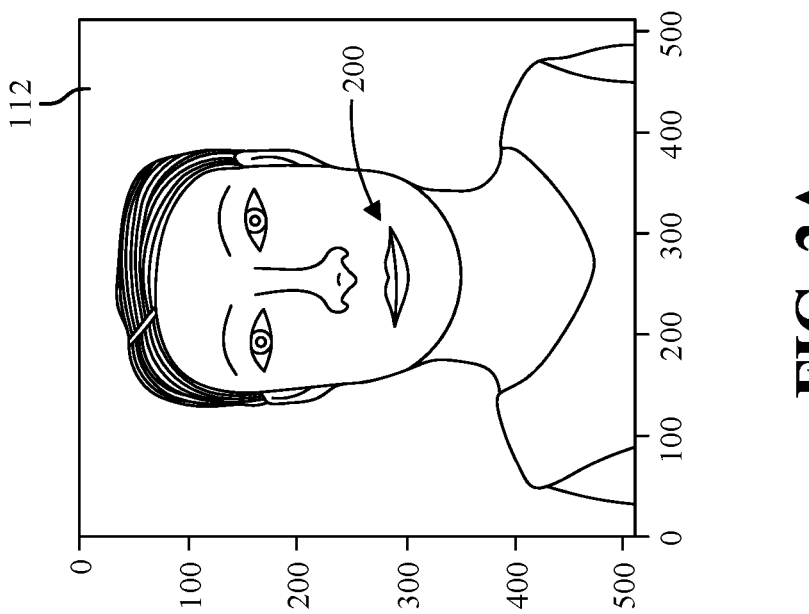

The distortion of control image 110 by distortion engine 104 generates distorted control image 112. Distorted control image 112 is generated by reconfiguring pixels of the control image with the distortion function and augmenting the pixels with additional pixels generated by interpolation. Referring now additionally to FIGS. 2A and 2B, distorted control image 112 is shown as having been generated by distortion engine 104 using a cubic polynomial to distort control image 110. Illustratively, in FIG. 2A, ROI 200 is the mouth portion of the image. ROI 200 of distorted control image 112 is expanded relative to the background and other portions of control image 110. FIG. 2B graphically displays the results of calculations associated with the distortion generated by distortion engine 104. Regions 204*a* and 204*b* correspond to the now-shrunken portions of the background in distorted control image 112, while region 202 corresponds to now-enhanced ROI 200. Straight line 206 graphically represents the undistorted row and column indices of control image 110 coordinates prior to their reconfiguration by distortion engine 104. Cubic polynomial 208 is non-linear and corresponds to the reconfiguration of the row indices of distorted control image 112, and non-linear cubic polynomial 210 corresponds to the reconfiguration of the column indices. The slopes (first derivatives) of cubic polynomials 208 and 210 are less than one within region 202 corresponding to ROI 200, as augmented in distorted control image 112, while in both regions 204*a* and 204*b* the slopes are greater than one. The cubic polynomial slopes are less than one, indicating a zooming in on ROI 200, thereby enlarging the region relative to other regions. The slopes greater than one indicate zooming out or shrinking of corresponding regions 204*a* and 204*b* relative to region 202.

Distorted control image 112 provides a ground truth, or guide, against which images generated by generative AI model 106 are compared in generating distorted image 116. That is, successive versions of distorted image 116 are generated by generative AI model 106, iteratively refining the model's parameters until the difference between distorted AI image generated by the model is sufficiently similar to distorted control image 112. Because distorted control image 112 includes a greater number of pixels corresponding to the ROI, generative AI model 106 is more likely to learn—using distorted control image 112 as the guide or ground truth—to render the ROI of an image with greater accuracy and fidelity than the model would if it were constrained by the smaller, higher variability of ROI pixels were the image not distorted. Using distorted control image 112 as the ground truth, generative AI model 106 is trained against distorted control image 112 using distorted contour image 114, which is data that is also distorted by distortion engine 104. In various embodiments, distorted contour image 114 is data distorted by the same distortion function implemented by distortion engine 104 to generate distorted control image 112 by distorting control image 110.

Different types of data may be distorted by distortion engine 104 for training generative AI model 106. For example, in certain embodiments, distorted contour image 114 is a distorted contour image whose creation is guided by landmarks of control image 110. The landmarks are distorted by applying the distortion function, and the distorted landmarks are used to create the distorted contour image. In other embodiments, for example, multimodal data is used to train AI model 106. The multimodal data may include distorted contour image 114 complemented by audio data. In various embodiments, the audio data may include visemes, phonemes, and/or mel-frequency cepstral coefficients (MFCCs). When complemented with audio data, a portion of the ROI (e.g., mouth) is removed from distorted contour image 114, and the removed portion is driven by the audio data. For example, the audio data drives the generation of the mouth when the mouth is removed from distorted contour image 114.

Figure 3:
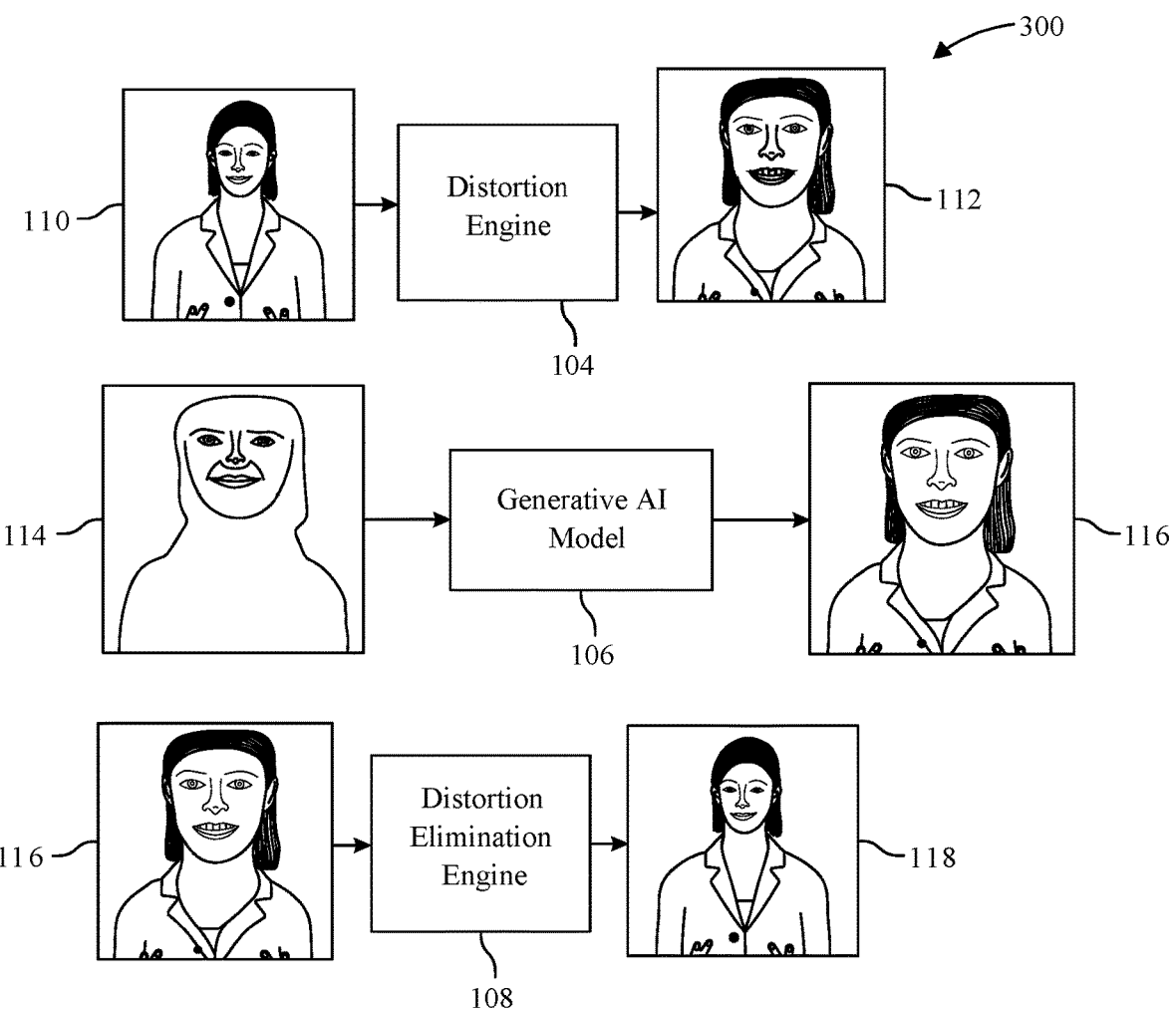
FIG. 3 illustrates other operative aspects, according to certain embodiments, of the DBIR framework of FIG. 1.

FIG. 3 illustrates a non-limiting example procedure 300 performed by DBIR framework 100. Generative AI model 106 learns to generate distorted image 116 against distorted control image 112, which serves as the ground truth, using distorted contour image 114. Distortion engine 104 distorts control image 110 by augmenting the ROI, which includes the mouth, lips, teeth of the image, thereby generating distorted control image 112. Generative AI model 106 learns to generate distorted AI image from distorted contour image 114, iteratively generating images until distorted image 116 is sufficiently close to the ground truth, namely distorted control image 112. The output of generative AI model 106 is thus distorted image 116. Distorted image 116 is distorted because the image is trained against distorted control image 112 using distorted contour image 114.

Generative AI model 106 during a run-time inference may generate distorted image 116 so that the image has the same physical characteristics of a source or control image input to the now-trained DBIR framework 100. Image distortion enables generative AI model 106 to generate an image in which the ROI has greater accuracy and higher fidelity than it would if the image were generated using conventional technology. To output a normal AI rendering, however, the distortion of distorted image 116 must be eliminated so that an undistorted image may be used in rendering a digital human.

In certain embodiments in which distortion engine 104 implements a reversible distortion function, distortion elimination engine 108 reverses the distortion function to generate undistorted image 118 from distorted image 116. A polynomial distortion function, however, is not necessarily a reversible function. A function is reversible if and only if it is one-to-one, meaning that each element in the domain maps to a unique element in the range. Accordingly, in certain embodiments in which a non-reversible distortion function is implemented by distortion engine 104, distortion elimination engine 108 generates a reverse distortion function by fitting a polynomial equation (e.g., cubic polynomial) to contours of distorted control image 112 and subtracts the distortion to generate undistorted image 118.

Figure 4:
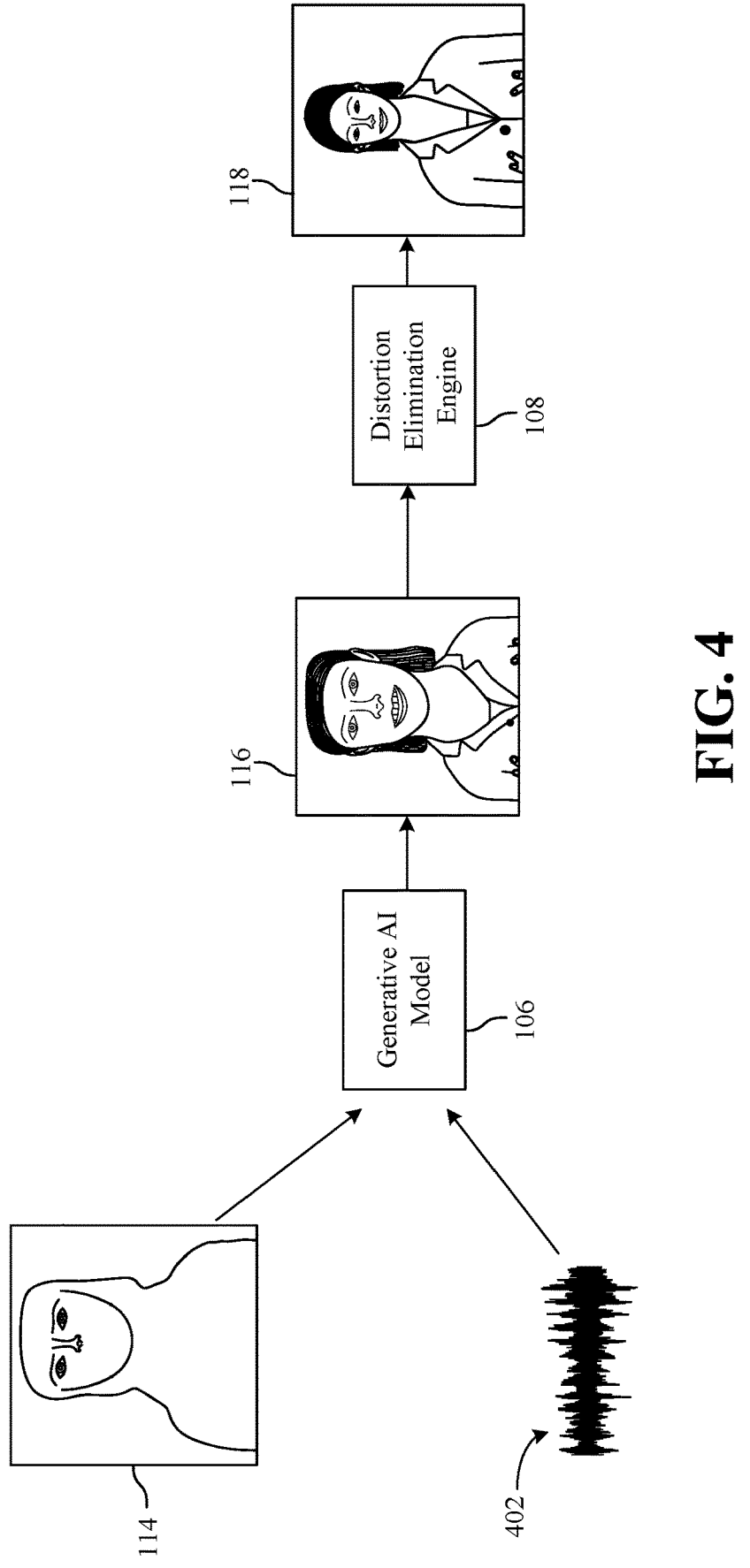
FIG. 4 illustrates still other operative aspects, according to other certain embodiments, of the DBIR framework of FIG. 1.

FIG. 4 illustrates a non-limiting example procedure 400 of DBIR framework 100 using multimodal data. The multimodal data includes distorted contour image 114 complemented by audio data 402. Illustratively, the mouth region of distorted contour image 114 is removed (e.g., masked). The mouth region of distorted contour image 114 is generated from a contour image of control image 110 in which the landmarks for the mouth are eliminated. In generating distorted image 116 of the digital human, audio data 402 drives the generation of the mouth region of the image.

In certain embodiments, if control image 110 contains multiple ROIs, distortion engine 104 distorts each of the ROIs sequentially. Generative AI model 106 generates distorted control image 112, in which each ROI is enhanced according to the procedures already described.

Figure 5:
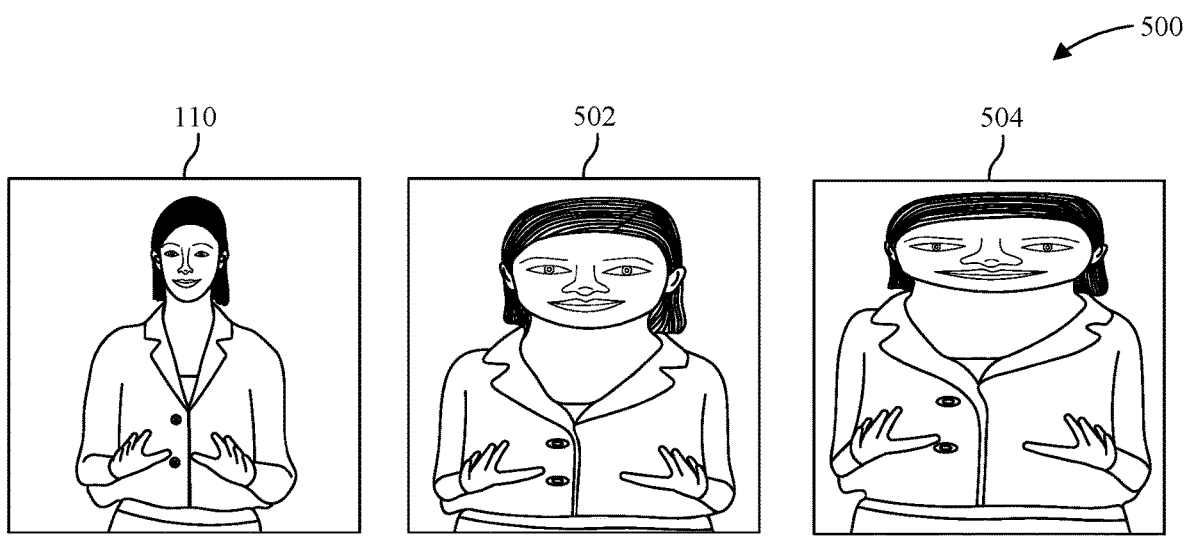
FIG. 5 illustrates yet other operative aspects, according to other certain embodiments, of the DBIR framework of FIG. 1.

FIG. 5 illustrates example procedure 500 whereby distortion engine 104 generates first distorted image 502 by distorting the mouth region of control image 110. First distorted image 502 is fed back into distortion engine 104, which generates second distorted image 504 by distorting the hand regions of first distorted image 502. During training, generative AI model 106 is guided by the enhanced mouth region of second distorted image 504 and by the enhanced hand regions, thus learning to provide images in which the mouth and hands are rendered with high fidelity. An undistorted image is recovered by feeding second distorted image 504 into distortion elimination engine 108, which eliminates the distortion of the hand regions, and then re-feeding second distorted image 504 into distortion elimination engine 108 to eliminate distortion of the mouth region. Thus, an undistorted image is recovered by sequentially eliminating the distortion from each ROI in the reverse order in which the ROIs were distorted.

FIG. 6 is an example method 600 illustrating certain operative features of DBIR framework 100 in accordance with some of the inventive arrangements disclosed herein. Method 600 pertains to rendering a digital human using generative AI using high-resolution images generated by DBIR framework 100. In block 602, generative AI model 106 generates distorted image 116, a distorted image of a digital human.

Generative AI model 106, as described above, is previously trained against distorted control image 112. Distorted control image 112 is generated using a distortion function to distort control image 110 (image of a human), which is used to guide image generation by generative AI model 106. Distorted control image 112 is generated by reconfiguring and augmenting pixels of control image 110.

In block 604, undistorted image 118 is generated. Undistorted image 118 is an undistorted image of the digital human and is generated by reversing the distortion of distorted image 116 using a reverse distortion function. Repeating the procedure yields multiple undistorted images of the digital human.

In block 606, animation of the digital human may be generated. The animation of the digital human is created by sequentially rendering the multiple undistorted images of the digital human in an ordered sequence.

FIG. 7 is an example method 700 illustrating certain operative features of DBIR framework 100 in accordance with some of the inventive arrangements disclosed herein. Method 700 pertains to training generative AI model 106 for generating distorted images of a digital human, from which one or more high-resolution, undistorted images of the digital human are generated.

In block 702, ROI determiner 102 identifies an ROI within a control image of a human. In block 704, distortion engine 104 generates distorted control image 112 by distorting the control image. Distorted control image 112 is generated by a distortion function implemented by distortion engine 104. The distortion function distends the ROI by reconfiguring and augmenting pixels of the control image corresponding to the ROI, thereby expanding the ROI relative to other regions of the control image.

In block 706, distorted image 116 of a digital human is generated using generative AI model 106. Distorted image 116 is generated by generative AI model 106, which learns to generate distorted image 116 against distorted control image 112, as distorted by the distortion function.

In certain embodiments, generative AI model 106 learns to generate distorted image 116 using distorted contour image 114 input to the model. Distorted contour image 114, in some embodiments, comprises a distorted contour image, whose creation is guided by landmarks of control image 110. The landmarks are distorted by applying the distortion function. The distorted landmarks are used to create the distorted contour image. For example, if the ROI corresponds to the mouth of control image 110 of the human, then the distortion data comprises distorted landmarks corresponding to landmarks of control image 110, the distorted landmarks created by applying the distortion function to landmarks of control image 110.

Once generative AI model 106 is trained, multiple distorted images of the digital human may be generated using the distorted contour image. Multiple undistorted images may be generated from the multiple distorted images by distortion elimination engine 108. The multiple undistorted images may be sequentially rendered in an order manner to generate an animated version of the digital human.

In certain embodiments, generative AI model 106 learns to generate distorted image 116 using distortion data input to the generative AI model, the distortion data comprising multimodal data. For example, multimodal data may include portions of an audio segment and a contour image. In an illustrative, non-limiting example the ROI corresponds to the mouth of control image 110 of the human. The audio drives the mouth region in generating distorted image 116 of the digital human.

The distortion function implemented by distortion engine 104 is a continuous function. In certain embodiments, the continuous function is a monotonically non-decreasing function that distorts the ROI by generating a spline. In other embodiments, the distortion function generates radial expansion of pixels from an approximate center of the ROI.

Certain distortion functions implemented by distortion engine 104 are inherently reversible functions, such as a spline. Others, however, are not. Accordingly, in certain embodiments, in response to determining that the distortion function is non-reversible distortion elimination engine 108 fits a polynomial (e.g., cubic polynomial) to sampled points of distorted control image 112. Distortion elimination engine 108 is capable of reversing the distortion using the fitted polynomial.

In different uses of DBIR framework 100, control image 110 includes multiple ROIs. Thus, in accordance with certain arrangements, distortion engine 104 sequentially distorts each of the ROIs using the distortion function to distend each by re-aligning and augmenting pixels corresponding to each of the ROIs. Generative AI model 106 generates distorted image 116, for which the distorting enhances the ROIs. Undistorted image 118 is generated by distortion elimination engine 108. Distortion elimination engine 108 applies the reverse distortion function to each of the ROIs in a reverse sequence of the distortion of each ROI performed by distortion engine 104.

In certain embodiments, the ROI of the control image is identified by ROI identifier 102, which is configured to identify annotations applied to the ROI. For example, the mouth may be enclosed in a bounding box. As noted however, an ROI such as the mouth exhibits a relatively high level of variance of the pixel values of the ROI from one frame to the next of the control image. For example, if the images are of a human speaking the pixels of the lips, mouth, and jaw vary from one frame to another owing to the human speaking. Accordingly, in some embodiments ROI identifier 102 is configured to compute a variance of values of pixels among multiple frames of the control image in which different actions are performed (e.g., mouth speaking). If the variance exceeds a predetermined threshold, then ROI identifier 102 identifies the region as an ROI.

Undistorted image 118 serves to provide a higher-resolution version of control image 110, enabling a neural rendering or other model to generate a highly photo-realistic digital human. In one or more embodiments, the digital human may be endowed with AI capabilities for interpreting user input and responding to the user input in a contextually appropriate manner. The digital human can interact with a user using verbal and/or non-verbal cues. Implementing natural language processing (NLP), a chatbot, and/or other software, the digital human can be configured to provide human-like interactions with the individual and/or perform activities such as scheduling, initiating, terminating, and/or monitoring of the operations of various systems and devices.

Figure 8:
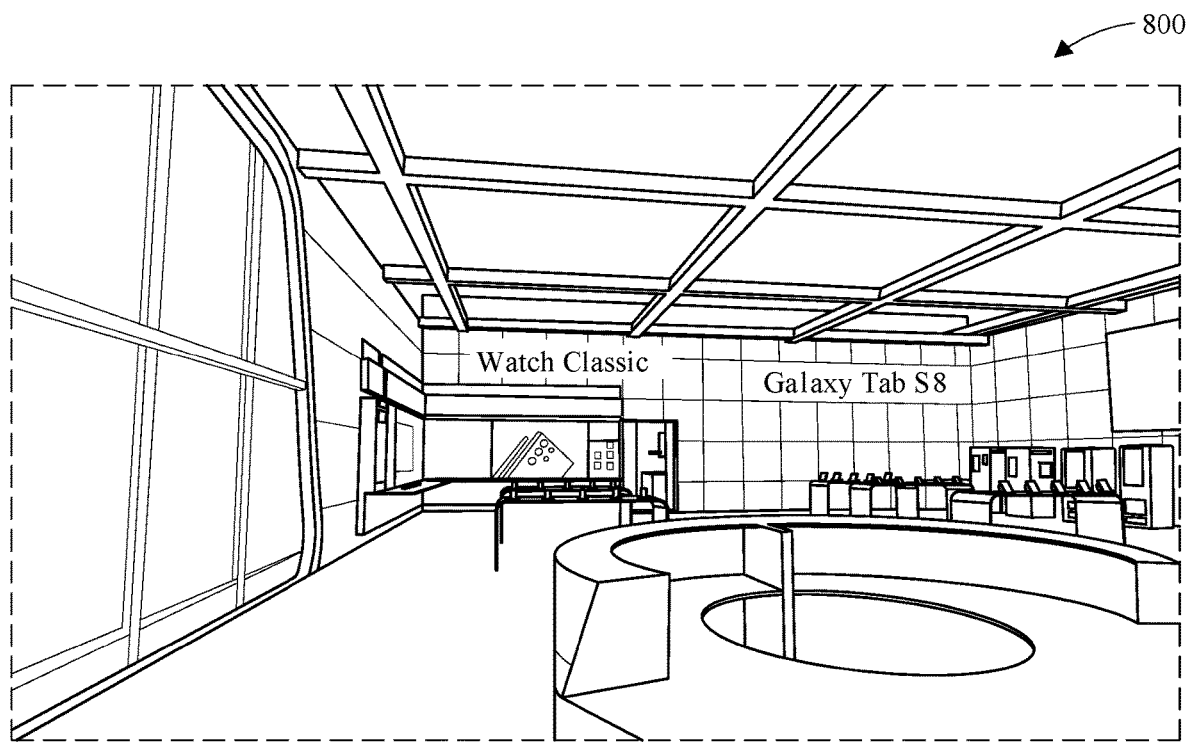
FIG. 8 illustrates an example metaverse environment in which operates a digital human created using the DBIR framework of FIG. 1.

Accordingly, the digital human may be rendered within various virtual computing environments, such as metaverse 800 illustrated in FIG. 8. The digital human may be generated with speech capabilities as a virtual news anchor, presenter, greeter, receptionist, coach, and/or influencer, for example. The digital human may be configured to operate as a virtual assistant that is pre-programmed to assist a user seeking one or more types of information.

Figure 9:
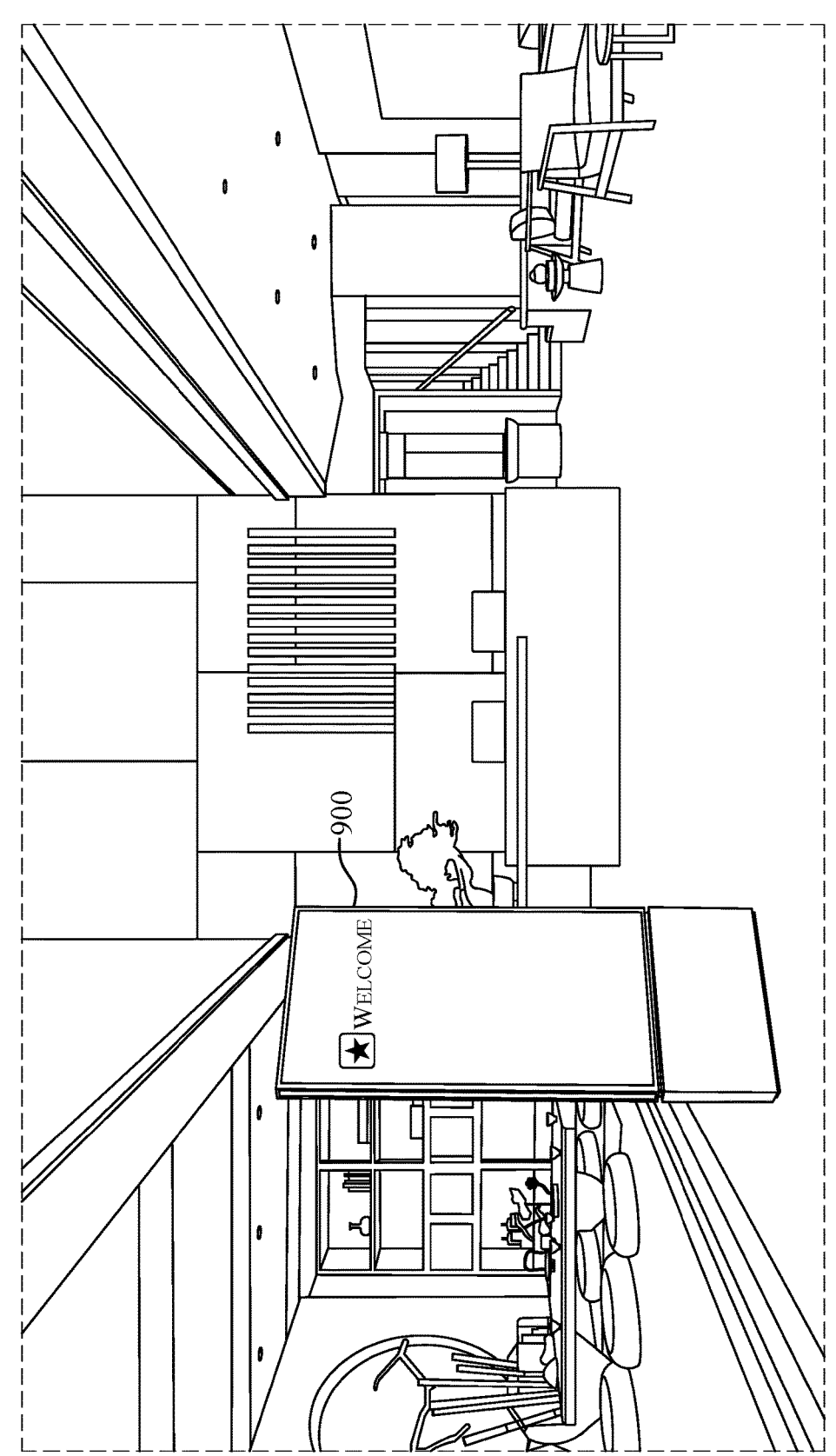
FIG. 9 illustrates an example kiosk device with which a user may interact with a digital human created using the DBIR framework of FIG. 1.
Figure 10:
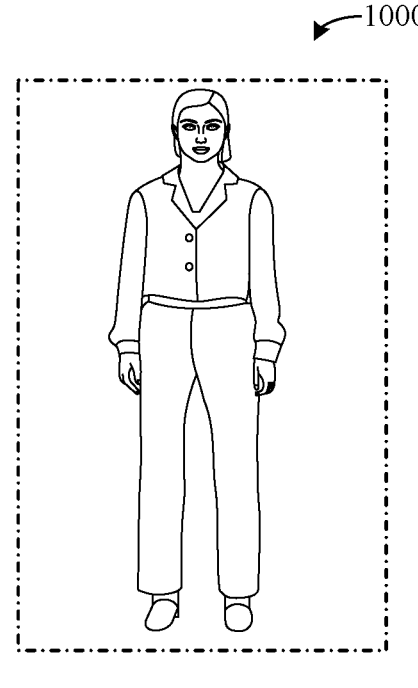
FIG. 10 illustrates an example digital human generated with images created by the DBIR framework of FIG. 1.

FIG. 9 illustrates an example device 900 is implemented as a kiosk situated in a lobby 902 and having a screen, microphone, and display for rendering video and audio to a user in response to input from the user. FIG. 10 illustrates digital human animation 1000 which may be rendered on device 900 as a life-sized figure capable of interacting with a user.

In other examples, the digital human may operate as an artificial intelligence chat bot and/or visual component of a virtual assistant. Adding a visual component in the form of a digital human to an automated or AI-enabled chat bot may provide a human-like dimension to machine-human inter-actions. The digital human may be used as a visual compo-nent displayed in a display device coupled to or paired with a smart-speaker virtual assistant to make interactions more human-like. In one or more examples the digital human as a chat assistant may not only message (e.g., send text messages) into a chat with a user, but also have a visual human-like form that reads the answer. Based on the dis-closed technology, the digital human as virtual assistant can be conditioned on both audio and head position, while keeping high quality rendering of ROIs such as the mouth, eyes, and/or hands.

Figure 11:
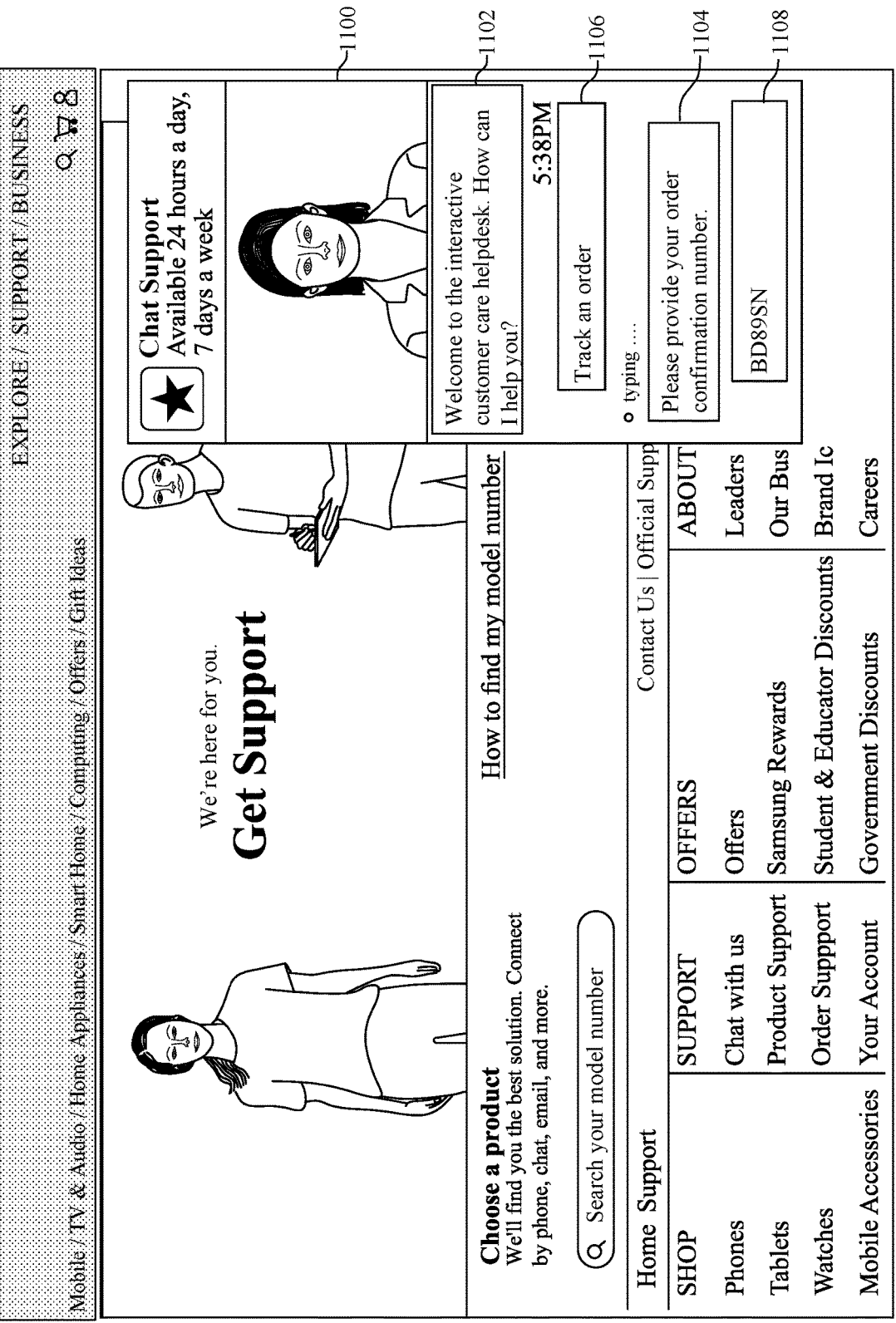
FIG. 11 illustrates an example implementation of a digital human in the context of chat support provided by the digital human generated with images created by the DBIR framework of FIG. 1.

FIG. 11 illustrates an example of the digital human as virtual chat assistant 1100. Illustratively, virtual chat assis-tant 1100 not only engages with a user by sending text messages during a chat, but also appears in human-like form reading responses to user-conveyed text messages. Gener-ated from an image created with DBIR framework 100, virtual chat assistant 1100's lip motions closely track the audio rendering of the assistant's text responses 1102 and 1104 to user text request 1106. The user is able to interact with virtual chat assistant by way of field 1108 whether by voice or typing.

Figure 12:
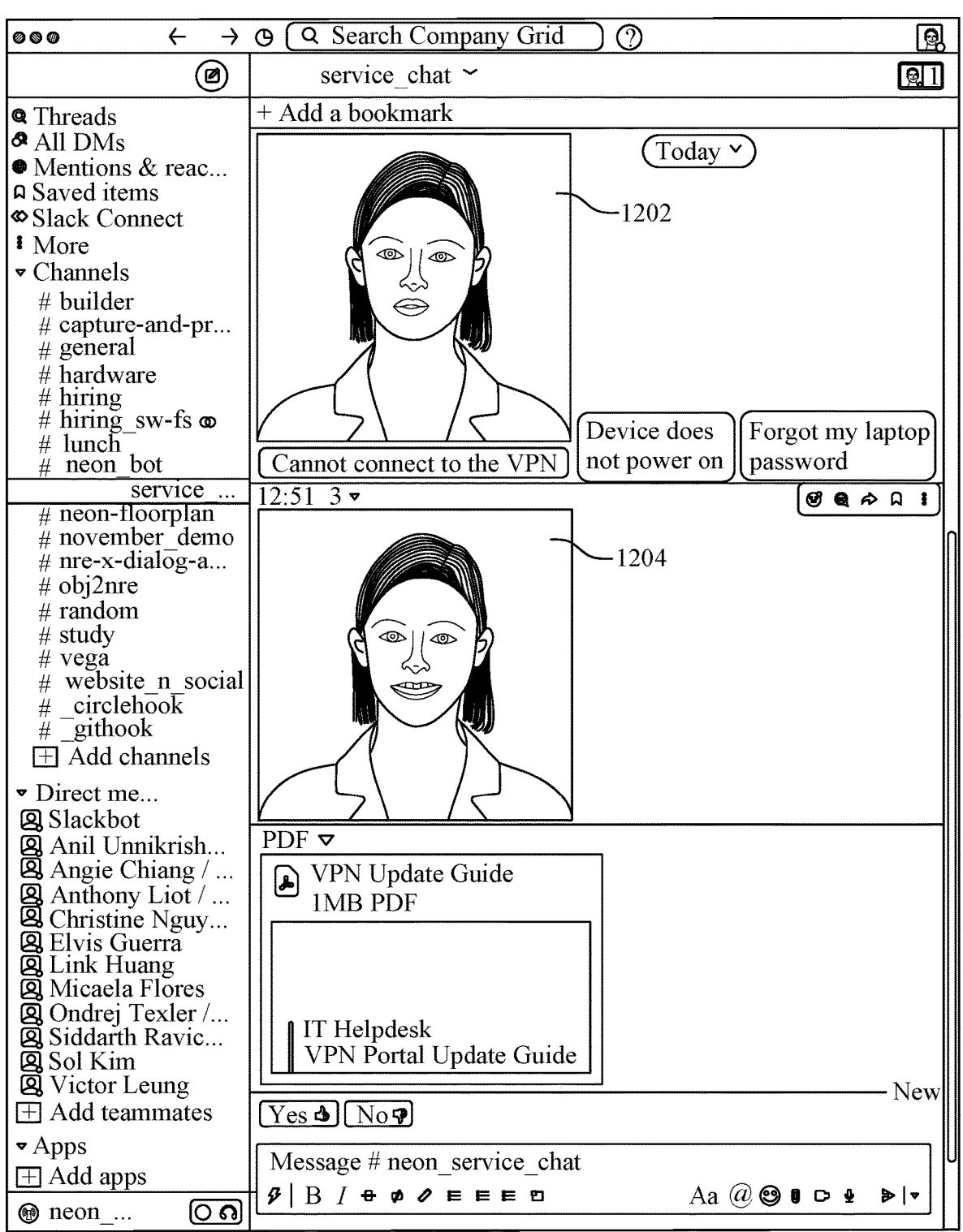
FIG. 12 illustrates another example implementation of a digital human in the context of chat support provided by the digital human generated with images created by the DBIR framework of FIG. 1.

FIG. 12 also illustrates another example of a digital human as a virtual chat assistant 1200. Illustratively, the virtual chat assistant conveys an answer to queries by speaking the answer in illustrative frames 1202 and 1204. Again, as generated from an image created with DBIR framework 100, the virtual chat assistant's lip motions closely track the assistant's verbal responses.

Figure 13:
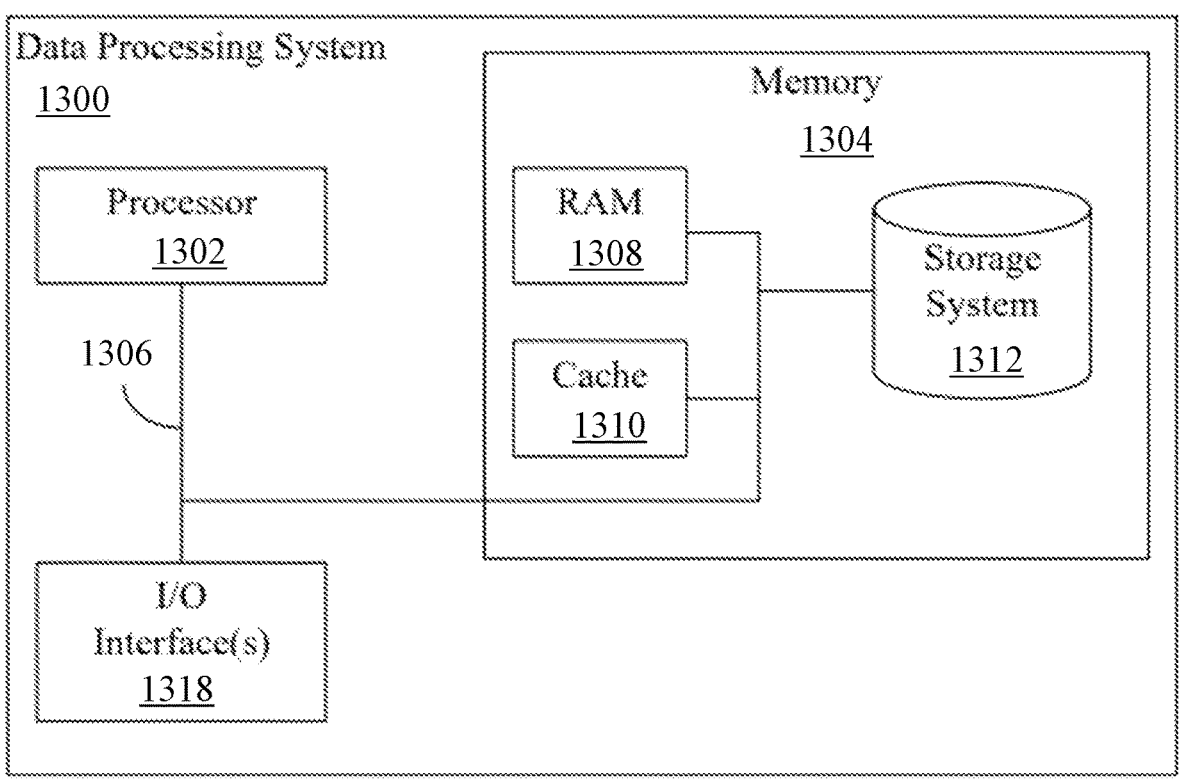
FIG. 13 illustrates an example implementation of a data processing system for use with the DBIR framework described within this disclosure.

FIG. 13 illustrates an example hardware architecture of a data processing system 1300. As defined herein, the term "data processing system" means one or more hardware systems configured to process data, each hardware system including at least one processor and memory, wherein the processor is programmed with computer-readable instruc-tions that, upon execution, initiate operations. Data process-ing system 1300 can include a processor 1302, a memory 1304, and a bus 1306 that couples various system compo-nents including memory 1304 to processor 1302.

Processor 1302 may be implemented as one or more processors. In an example, processor 1302 is implemented as a central processing unit (CPU). Processor 1302 may be implemented as one or more circuits capable of carrying out instructions contained in program code. The circuit may be an integrated circuit or embedded in an integrated circuit. Processor 1302 may be implemented using a complex instruction set computer architecture (CISC), a reduced instruction set computer architecture (RISC), a vector pro-cessing architecture, or other known architectures. Example processors include, but are not limited to, processors having an x86 type of architecture (IA-32, IA-64, etc.), Power Architecture, ARM processors, and the like.

Bus 1306 represents one or more of any of a variety of communication bus structures. By way of example, and not limitation, bus 1306 may be implemented as a Peripheral Component Interconnect Express (PCIe) bus. Data process-ing system 1300 typically includes a variety of computer system readable media. Such media may include computer-readable volatile and non-volatile media and computer-readable removable and non-removable media.

Memory 1304 can include computer-readable media in the form of volatile memory, such as random-access memory (RAM) 1308 and/or cache memory 1310. Data processing system 1300 also can include other removable/ non-removable, volatile/non-volatile computer storage media. By way of example, storage system 1312 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1306 by one or more data media interfaces. Memory 1304 is an example of at least one computer program product.

Memory 1304 is capable of storing computer-readable program instructions that are executable by processor 1302. For example, the computer-readable program instructions can include an operating system, one or more application programs, other program code, and program data. The computer-readable program instructions may implement any of the different examples of DBIR framework 100 as illus-trated throughout the figures described herein. Processor 1302, in executing the computer-readable program instruc-tions, is capable of performing the various operations described herein that are attributable to a computer. It should be appreciated that data items used, generated, and/or oper-ated upon by data processing system 1300 are functional data structures that impart functionality when employed by data processing system 1300. As defined within this disclo-sure, the term "data structure" means a physical implemen-tation of a data model's organization of data within a physical memory. As such, a data structure is formed of specific electrical or magnetic structural elements in a memory. A data structure imposes physical organization on the data stored in the memory as used by an application program executed using a processor. Examples of data structures include images and meshes.

Data processing system 1300 may include one or more Input/Output (I/O) interfaces 1318 communicatively linked to bus 1306. I/O interface(s) 1318 allow data processing system 1300 to communicate with one or more external devices and/or communicate over one or more networks such as a local area network (LAN), a wide area network (WAN), and/or a public network (e.g., the Internet). Examples of I/O interfaces 1318 may include, but are not limited to, network cards, modems, network adapters, hard-ware controllers, etc. Examples of external devices also may include devices that allow a user to interact with data processing system 1300 (e.g., a display, a keyboard, a microphone for receiving or capturing audio data, speakers, and/or a pointing device).

Data processing system 1300 is only one example imple-mentation. Data processing system 1300 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

Examples of various devices and/or systems that may be implemented using the hardware architecture illustrated in FIG. 13 and that execute the various executable frameworks described herein either individually or in combination with other devise can include one or more of a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, information appliance, IoT device, server, a virtual reality (VR) system, an augmented reality (AR) system, a mixed reality (MR) system, an extended reality (XR) system, a metaverse system, or the like. In another example, the hardware architecture illustrated in FIG. 13 may be used to implement a kiosk configured with a video display and/or audio capabilities, or other computing or information appliance that may be positioned so as to be accessible by a plurality of different users over time.

The example of FIG. 13 is not intended to suggest any limitation as to the scope of use or functionality of example implementations described herein. Data processing system 1300 is an example of computer hardware that is capable of performing the various operations described within this disclosure. In this regard, data processing system 1300 may include fewer components than shown or additional components not illustrated in FIG. 13 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example hardware architecture illustrated by data processing system 1300 in FIG. 13 is not intended to suggest any limitation as to the scope of use or functionality of example implementations described herein. Data processing system 1300 is only an example hardware architecture that is capable of performing the various operations described within this disclosure. In this regard, data processing system 1300 may include fewer components than shown or additional components not illustrated in FIG. 13 depending upon the particular type of device and/or system that is implemented. The particular operating system and/or application (s) included may vary according to device and/or system type as may the types of I/O devices included. Furthermore, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the disclosed technology described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method of rendering a digital human using generative artificial intelligence (AI), the method comprising:

generating, with a generative AI model, a distorted image of the digital human by enhancing a region of interest (ROI) within the distorted image relative to other regions of the distorted image;

wherein the generative AI model is trained against a distorted control image generated using a distortion function to distort a control image used to guide image generation by the generative AI model, the distorted control image generated by reconfiguring pixels of the control image with the distortion function and augmenting the pixels with pixels generated by interpolation; and generating an undistorted image of the digital human using a reverse distortion function to reverse distortion of the distorted image.

2. The computer-implemented method of claim 1, wherein the generative AI model learns to generate the distorted image from data input to the generative AI model, wherein the data comprises a distorted contour image generated from landmarks of the control image in which the landmarks are distorted by the distortion function.

3. The computer-implemented method of claim 1, wherein the generative AI model learns to generate the distorted image from data input to the generative AI model, wherein the data comprises a distorted contour image, and wherein a mouth of the distorted image is generated using audio data.

4. The computer-implemented method of claim 1, wherein the distortion function is a continuous monotonically non-decreasing function that distorts the ROI by generating at least one of a spline or radial expansion from an approximate center of the ROI.

5. The computer-implemented method of claim 1, wherein the reverse distortion function is generated by fitting a polynomial to sampled points of the distorted image.

6. The computer-implemented method of claim 1, wherein the control image includes one or more additional ROIs, the method further comprising:

sequentially distorting the control image using the distortion function to distend each of the one or more additional ROIs by re-aligning and augmenting pixels corresponding to each of the one or more additional ROIs; and generating the undistorted image by applying the reverse distortion function to the ROI and the one or more additional ROIs in a reverse sequence of the distorting the ROI and the one or more additional ROIs.

7. A computer-implemented method of training a generative artificial intelligence (AI) model, the method comprising:

identifying a region of interest (ROI) within a control image of a human;

generating a distorted control image by distorting the control image using a distortion function that distends the ROI by reconfiguring and augmenting pixels of the control image corresponding to the ROI to thereby expand the ROI relative to other regions of the control image; and generating, using a generative AI model, a distorted image, wherein the generative AI model learns to generate the distorted image against the distorted control image as distorted by the distortion function.

8. The computer-implemented method of claim 7, wherein the generative AI model learns to generate the distorted image from data input to the generative AI model, wherein the data comprises a distorted contour image generated from landmarks of the control image in which the landmarks are distorted by the distortion function.

9. The computer-implemented method of claim 7, wherein the generative AI model learns to generate the distorted AI image using multimodal data input to the generative AI model.

10. The computer-implemented method of claim 9, wherein the multimodal data includes a distorted contour image, and wherein a mouth of the distorted image is generated using audio data.

11. The computer-implemented method of claim 7, wherein the distortion function is a monotonically non-decreasing function that distorts the ROI by generating at least one of a spline or radial expansion from an approximate center of the ROI.

12. The computer-implemented method of claim 7, wherein the generative AI model is a generative adversarial network.

13. The computer-implemented method of claim 7, wherein the control image includes one or more additional ROIs, the method further comprising:

sequentially distorting the control image using the distortion function to distend each of the one or more additional ROIs by reconfiguring and augmenting pixels corresponding to each of the one or more additional ROIs; and generating an undistorted image by applying a reverse distortion function to the ROI and to the one or more additional ROIs in a reverse sequence of the distorting of the ROI and the one or more additional ROIs.

14. A system, comprising:

one or more processors configured to execute operations including:

generating, with a generative AI model, a distorted image of a digital human by enhancing a region of interest (ROI) within the distorted image relative to other regions of the distorted image;

wherein the generative AI model is trained against a distorted control image generated using a distortion function to distort a control image used to guide image generation by the generative AI model, the distorted control image generated by reconfiguring pixels of the control image with the distortion function and augmenting the pixels with pixels generated by interpolation; and generating an undistorted image of the digital human using a reverse distortion function to reverse distortion of the distorted image.

15. The system of claim 14, wherein the generative AI model learns to generate the distorted image from data input to the generative AI model, wherein the data comprises a distorted contour image generated from landmarks of the control image in which the landmarks are distorted by the distortion function.

16. The system of claim 14, wherein the generative AI model learns to generate the distorted image using multimodal data input to the generative AI model.

17. The system of claim 16, wherein the multimodal data includes a distorted contour image, and wherein a mouth of the distorted image is generated using audio data.

18. The system of claim 14, wherein the distortion function is a monotonically non-decreasing function that distorts the ROI by generating at least one of a spline or radial expansion from an approximate center of the ROI.

19. The system of claim 14, wherein the reverse distortion function is generated by fitting a polynomial to sampled points of the distorted image.

20. The system of claim 14, wherein the control image includes one or more additional ROIs, wherein the one or more processors are configured to execute operations further comprising:

sequentially distorting the control image of the human using the distortion function to distend each of the one or more additional ROIs by reconfiguring and augmenting pixels corresponding to each of the one or more additional ROIs; and generating the undistorted image by applying the reverse distortion function to the ROI and to the one or more additional ROIs in a reverse sequence of the distorting of the ROI and the additional ROIs.

\* \* \* \* \*